UNITED STATES PATENT OFFICE.

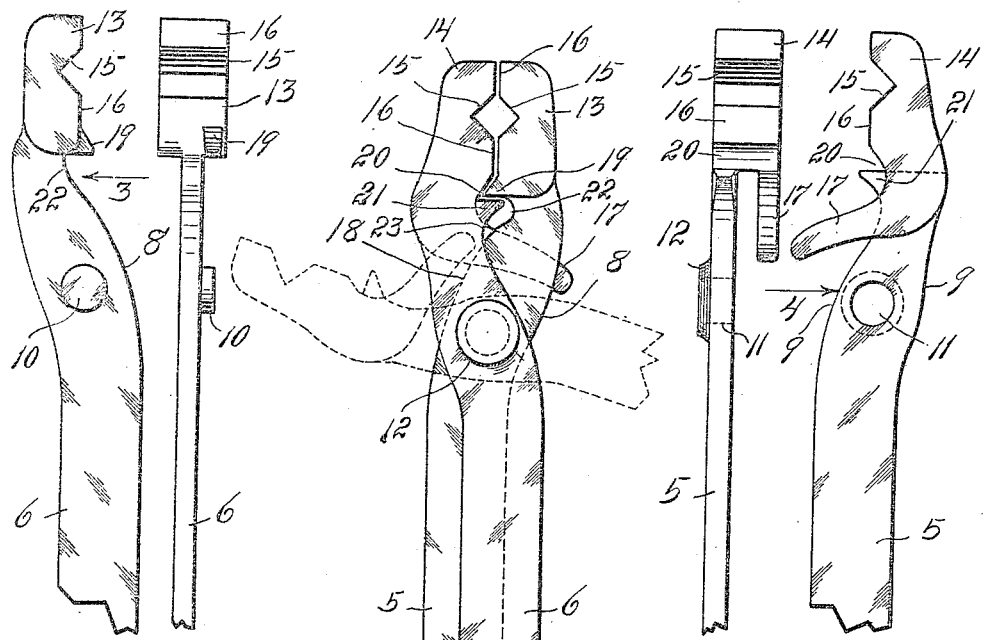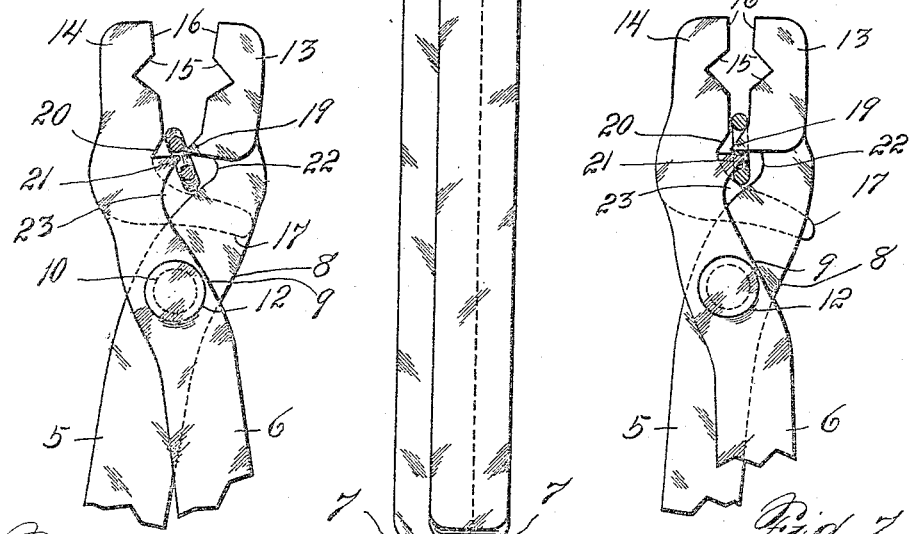

GEORGE L. McDERMOTT, OF DENVER, COLORADO.

SEPARABLE TOOL.

1,243,434.　　　　　Specification of Letters Patent.　　Patented Oct. 16, 1917.

Application filed August 12, 1916. Serial No. 114,551.

*To all whom it may concern:*

Be it known that I, GEORGE L. McDERMOTT, citizen of the United States, residing at the city and county of Denver and State of Colorado, have invented certain new and useful Improvements in Separable Tools; and I do declare the following to be a full, clear, and exact description of the invention, such as will enable others skilled in the art to which it appertains to make and use the same, reference being had to the accompanying drawings, and to the characters of reference marked thereon, which form a part of this specification.

My present invention relates to a separable tool of the plier type, and my object is to so construct the said tool that it can be taken apart and the members comprising the same employed as tire irons. The usual tire irons which are provided for every automobile tool chest are indispensable for the purpose of applying and removing tires, and it is my object to provide a single tool which will not only perform the function of a pair of pliers or other similar combination tool, but one which can also be substituted for the usual tire irons. In order to accomplish this result each of the members is formed with a head or jaw part at the opposite extremity from that used for the tire removing purposes. One of the members is formed with a rearwardly extending part integral with the head or jaw portion and also a recessed boss or socket adjacent to but slightly in the rear of the jaw part. The other member is provided with a pin extending therefrom adapted to enter the pocket or recess to form a pivot about which the jaws are moved when the device is used as a wrench or as a pair of pliers. The coöperating jaws are provided with recessed gripping parts which may be square, rectangular or of any desired contour to serve the purpose of gripping the head of a bolt, nut or other removable part of the machine. The jaws are also provided with a pair of coöperating extensions which move by one another as the device is operated in arcuate paths. These lugs or extensions are intended, primarily, to be used for the purpose of spreading a link of a chain which may have become compressed or bent out of shape. The extension or tongue which is carried by one of the members is curved in such manner that it projects rearwardly to a point adjacent the pocket or boss with which the pin carried on the other member engages to form the pivotal connection between the two. When the two members are in the normal position for use as a combination tool this tongue extends on the outside of the member carrying the pivot pin and it, together with the pivot pin, form an interlocking connection between the parts which prevent their moving laterally in respect to each other. By constructing the parts in this manner a person is enabled to quickly assemble the two members without the use of any separate or third member and produce in effect a combination tool which will work for the purpose intended without danger of the two members becoming separated. The separated members can also be readily detached one from the other and used individually as tire irons without in any way impairing their additional function as parts of a combination tool.

With this and other objects in view the invention consists in the combination and arrangement of parts more fully set forth in the following specification, illustrated in the accompanying drawing and pointed out in the appended claims.

In the drawings:—

Figure 1 is a side elevation of a pair of the tire irons constructed according to the present invention and assembled in interlocking relation to one another so as to be used as a wrench or pair of pliers.

Fig. 2 is a side elevation of the head or jaw portion of one of the members showing the opposite side to that illustrated in Fig. 1.

Fig. 3 is an edge view of the member shown in Fig. 2 looking in the direction of arrow 3.

Fig. 4 is a view similar to Fig. 2 of the other member.

Fig. 5 is an edge view of the member illustrated in Fig. 4 looking in the direction of the arrow 4.

Fig. 6 is a view similar to Fig. 1 showing the first position of the jaw members when the device is to be used for the purpose of spreading a link of a chain that has become compressed. In this view the handle portions are broken away.

Fig. 7 is a view similar to Fig. 6 illustrating the second position of the members the link being here shown as open or spread apart to its normal position.

Referring now to the drawing, the two tire irons may be designated by the reference characters 5 and 6 respectively and they are provided at one end with a tapering, rounded extremity 7 of the usual character. These tire irons are adapted to be used in the well known manner for applying and removing a tire to and from the retaining rim of the wheel. Instead of being formed straight throughout their length, as is usually the custom, the members 5 and 6 are formed with slightly curved or offset portions 8 and 9 respectively, near the ends opposite to those used for tire removing purposes. These offset or bent portions are curved in opposite directions so that as the members are assembled they will cross each other and means are provided for forming a pivotal connection at the point where the members cross. This means consists of a circular pin 10 rigidly secured or formed integrally with the member 5. A correspondingly shaped recess 11 is formed on the inner side of the member 6 and is closed by means of a circular boss 12. The members 5 and 6 extend beyond this pivotal connection and curve outwardly in opposite directions, each being formed at its outer extremity with thickened, reinforced heads or jaw members 13 and 14 respectively. The inner gripping surfaces of these jaw members may be roughened or recessed to provide means for gripping a machine part such as a bolt head when the device is to be used as a wrench. Each of the head members is provided with an angular recess 15 as shown in the drawing. The two recesses coöperating when the jaws are brought into close relation to each other provide a square opening adapted to grip the head of a nut. Straight edges 16 are also formed on either side of the angular recesses 15 in order to afford contact bearing surfaces which will enable the implement to be used as a pair of pliers if desired. At one side of the thickened head portion 14 of the member 6 a curved depending extension or tongue 17 is provided which is suitably spaced from the upper curve or offset portion 9 a distance slightly greater than the thickness of the tire iron or member 5. This tongue or extension is curved downwardly in such manner that its lower extremity terminates at a point to one side of and slightly above the circular recess 11 with which the pivot pin 10 engages. The purpose of this depending tongue is to provide a guide arm which will prevent lateral displacement of the members after they are assembled as shown in Fig. 1.

In order to assemble the two members the iron 5 is held in a vertical position and the iron 6 is applied thereto in such manner that the pin 10 will register with the socket 11 and the depending tongue 17 will slip by the inner edge 18 of the curved offset part 8 of the member 5. The parts will then be in the position shown by dotted lines in Fig. 1 and as soon as the handle or tire iron extensions of the members are brought together the tongue 17 of the member 6 will pass behind the curved portion 8 of the member 5 until when the members are closed it will assume the position shown in full lines in Fig. 1.

The member 5 is provided with an angular projecting lug 19 formed below and continuous with the lower portion of the jaw gripping surface 16. A correspondingly shaped angular recess 20 is provided at the lower edge of the jaw 13 adapted to coöperate therewith. An angular projecting lug 21, similar in size and shape to the lug 19, is provided on the member 6 immediately below the recess or cavity. The metal is curved or cut away to form recesses 22 and 23 below the angular lugs 19 and 21 respectively to permit the proper manipulation of these parts when the device is used as a link spreader. It will be seen from Fig. 1 that as the two members are brought into closed position the lug 19 will fit within the recess 20 and will not interfere with a complete closing of the gripping surfaces of the two jaws.

Referring to Fig. 6 it will be seen that as the jaws 13 and 14 are slightly separated the lug 19 is moved away from the recess 20 and lug 21, and if a chain link which has become mashed is placed in the position there shown it can be easily straightened or extended into normal position by closing the jaws whereby the upper inclined surface of the lug 19 will exert a pressure against the inner portion of the link at one side thereof while the lower inclined surface of the lug 21 just below the recess 20 will similarly exert an outward pressure against the inner portion of the link on the opposite side. As the jaws are brought together to their closed position the link will be expanded until it assumes the position indicated in Fig. 7. This action is obtained by the movement of the lugs 19 and 21 as the tire irons or handle members are brought together. It will be seen that as the lugs advance from the position shown in Fig. 6 to that shown in Fig. 7 they pass each other in opposite directions moving along the arcs of concentric circles struck with the pivot 11 as their center. A tremendous pressure can be produced by this action for the lugs themselves operate upon the links as a pair of inclined planes, while the leverage exerted upon them is represented by practically the entire length of the irons 5 and 6 which serve during this operation as handles.

By providing the opposite ends of the two tire irons with the heads and coöperating jaw members here described and shown, one is enabled to quickly assemble the two members so as to provide a combination tool which may be used as a wrench, a pair of pliers, or a device for mending a non-skid chain. All of this can be accomplished without the use of any separate parts by simply placing one of the irons on the other and causing an interlocking relation of their parts. The construction of the head and jaw members and the provision of the pivotal connections between the two do not in any way impair the use of the two separate members as individual tire irons but serve as means for providing additional advantages which will greatly increase the value of the implement to the automobile owner and will avoid the necessity of carrying a number of tools in place of one.

Having thus described my invention, what I claim is:

1. A tool of the cross handle plier type comprising handle members one of which is provided with a pivot pin, the other being provided with a recess to receive said pin and a depending tongue member formed integral therewith and adapted to extend across the face of the first named member and coöperating with said pin to provide a pivotal connection between the two.

2. A tool of the cross handle plier type comprising handle members one of which is provided with a pivot pin, the other being provided with a recess to receive said pin and a depending tongue member formed integral therewith and adapted to extend across the face of the first named member and coöperating with said pin to provide a separable pivotal connection between the two for the purpose set forth.

In testimony whereof I affix my signature, in presence of two witnesses.

GEORGE L. McDERMOTT.

Witnesses:
H. A. VILLEMAGNE,
A. J. O'BRIEN.

Copies of this patent may be obtained for five cents each, by addressing the "Commissioner of Patents, Washington, D. C."